US010728459B2

(12) United States Patent
Gumpert et al.

(10) Patent No.: US 10,728,459 B2
(45) Date of Patent: Jul. 28, 2020

(54) SYSTEM AND METHOD FOR TRACKING MOVING OBJECTS IN A SCENE

(71) Applicant: Axis AB, Lund (SE)

(72) Inventors: Jacob Gumpert, Lund (SE); Leif Persson, Lund (SE); Robin Dahlström, Lund (SE); Mattias Gylin, Lund (SE)

(73) Assignee: Axis AB, Lund (SE)

( * ) Notice: Subject to any disclaimer, the term of this patent is extended or adjusted under 35 U.S.C. 154(b) by 24 days.

(21) Appl. No.: 16/013,472

(22) Filed: Jun. 20, 2018

(65) Prior Publication Data

US 2018/0376074 A1 Dec. 27, 2018

(30) Foreign Application Priority Data

Jun. 21, 2017 (EP) ..................... 17177082

(51) Int. Cl.
H04N 5/232 (2006.01)
G08B 13/196 (2006.01)
H04N 7/18 (2006.01)
G06T 7/292 (2017.01)

(52) U.S. Cl.
CPC ......... *H04N 5/23296* (2013.01); *G06T 7/292* (2017.01); *G08B 13/1963* (2013.01); *G08B 13/19608* (2013.01); *G08B 13/19641* (2013.01); *H04N 5/23203* (2013.01); *H04N 7/181* (2013.01); *G06T 2207/10044* (2013.01); *G06T 2207/10052* (2013.01)

(58) Field of Classification Search
CPC .......................... G06T 7/292; H04N 5/23296
See application file for complete search history.

(56) References Cited

U.S. PATENT DOCUMENTS 6,215,519 B1 * 4/2001 Nayar .............. G08B 13/19608
348/148
6,404,455 B1 6/2002 Ito et al.
(Continued)

FOREIGN PATENT DOCUMENTS

WO 2009/135262 A1 11/2009
WO 2012/151777 A1 11/2012

OTHER PUBLICATIONS

Certificate of Correction for U.S. Pat. No. 6,215,519 (Jun. 3, 2008).
(Continued)

*Primary Examiner* — Girumsew Wendmagegn
(74) *Attorney, Agent, or Firm* — Volpe and Koenig, P.C.

(57) ABSTRACT

A system for tracking movable objects in a scene comprising a first overview unit arranged to capture a first overview of a first portion of a scene, and a second overview unit arranged to capture a second overview of a second portion of a scene, wherein the first portion and the second portion may be partly overlapping. The system further comprises a PTZ-camera to image selected objects in the first or second portion of the scene. The first and the second overview unit are configured to detect and locate moving objects in the scene, and to transmit positional data of said moving objects to a control unit that determines if two or more movable objects may be imaged using a single view of the PTZ-camera, and to send instructions to the PTZ-camera to image said two or more movable objects concurrently.

17 Claims, 3 Drawing Sheets

(56) References Cited

U.S. PATENT DOCUMENTS

| | | |
|---|---|---|
| 2002/0030741 A1* | 3/2002 | Broemmelsiek ...... G01S 3/7864 |
| | | 348/169 |
| 2003/0053659 A1 | 3/2003 | Pavlidis et al. |
| 2005/0244033 A1* | 11/2005 | Ekin ...................... G01S 3/7864 |
| | | 382/103 |
| 2006/0056056 A1* | 3/2006 | Ahiska ............. G08B 13/19608 |
| | | 359/690 |
| 2006/0152584 A1 | 7/2006 | Wang et al. |
| 2007/0039030 A1 | 2/2007 | Romanowich et al. |
| 2009/0128618 A1 | 5/2009 | Fahn et al. |
| 2010/0128110 A1 | 5/2010 | Mavromatis |
| 2010/0265331 A1 | 10/2010 | Tanaka |
| 2011/0149072 A1 | 6/2011 | McCormack |
| 2011/0310219 A1* | 12/2011 | Kim ................. G08B 13/19643 |
| | | 348/36 |
| 2012/0098927 A1 | 4/2012 | Sablak |
| 2013/0162838 A1 | 6/2013 | Huang et al. |
| 2014/0139680 A1 | 5/2014 | Huang et al. |

OTHER PUBLICATIONS

Certificate of Correction for U.S. Pat. No. 6,215,519 (Mar. 26, 2002).

EP 17177082.9 European Search Report (dated Jun. 21, 2018).

\* cited by examiner

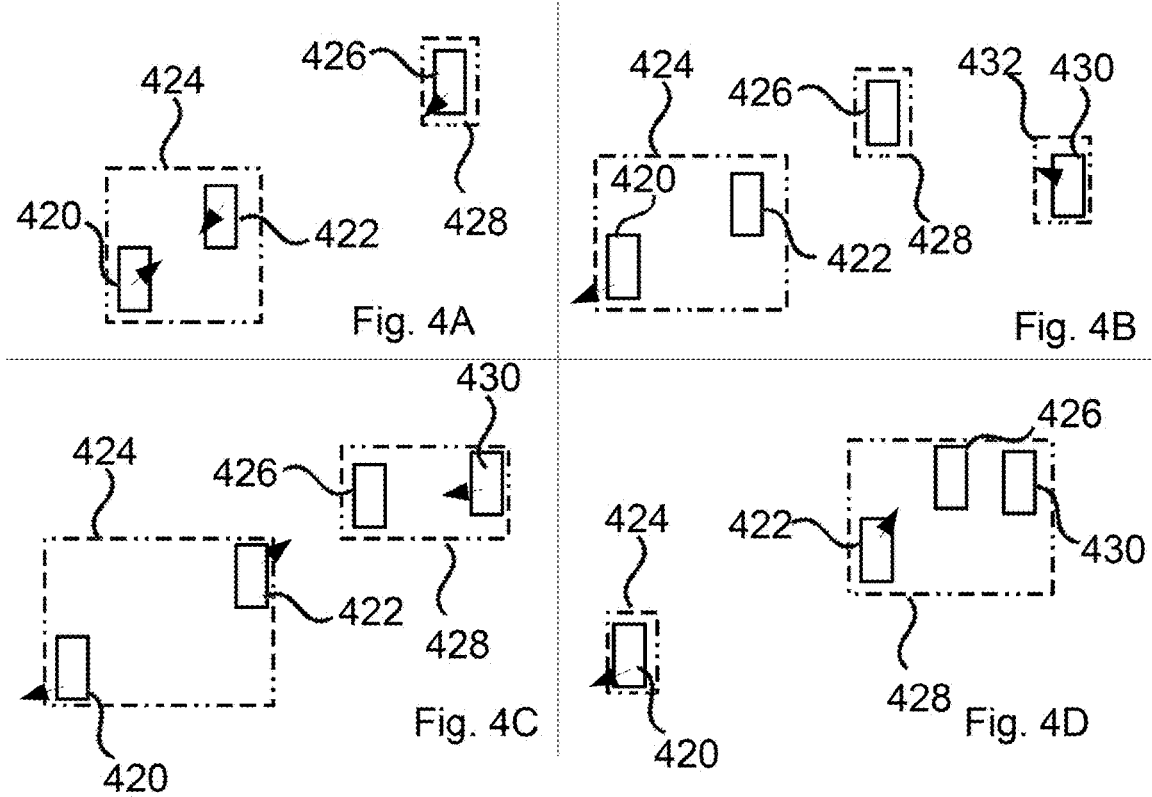
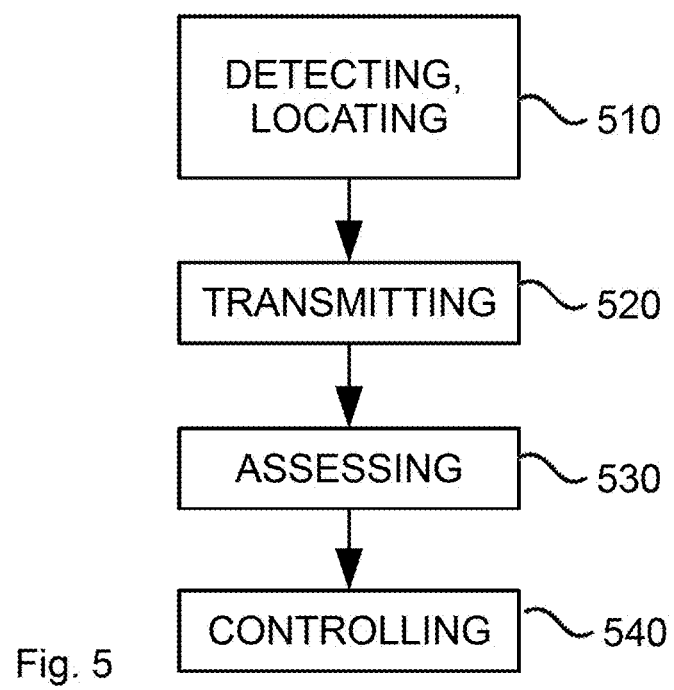

SYSTEM AND METHOD FOR TRACKING MOVING OBJECTS IN A SCENE

FIELD OF INVENTION

The present teachings relate to a system for tracking moving objects in a scene, and to a method for performing said tracking.

BACKGROUND

Monitoring cameras are commonly used to monitor building, roads, shops and various other places. In particular, cameras are often used to monitor scenes to allow automatic detection or tracking of events in the form of presence of motion or presence of an object of a specific type. Such monitoring cameras can be used both indoors and outdoors.

Closing in on the context of the present teachings there are camera arrangements consisting of one or more fixedly arranged cameras having a wide field of view and a pan-tilt-zoom camera (PTZ camera) enabling a narrow field of view (with elevated zoom). When using such camera arrangement an operator may use the fixedly arranged cameras as an input for an overview image, and subsequently utilize the PTZ camera to obtain a detailed view of a particular object located in the overview image (i.e., located in the imaged scene). A user may click on a position in an overview image whereby the PTZ camera is moved to the particular position. By defining a position and a size (e.g. by click and drag) the desired pan position, tilt position and zoom setting may be specified already in the overview image. Such a system is disclosed in US Patent Publication No. 2013/0162838.

The operation of a system having the above described functionality would require a translation from coordinates of an overview image (which may comprise views of several cameras) to pan, tilt, and zoom parameters for the PTZ camera. The calibration may be performed automatically or manually, and the result may be a system where information from an overview image, typically acquired by a statically arranged camera, may be used to control a movable camera, typically a PTZ camera. An early disclosure of such a system is found in U.S. Pat. No. 5,434,617.

In an installation where the PTZ camera is automatically guided to an object detected by the overview cameras there may be an issue as soon as a second object enters the overview scene in that some selection would have to be made; e.g. maintain the view of the first object as a default, shift to the second object as a default, or start switching between the two objects as a default.

The present teachings relate to improvements in this technical field, in particular when tracking two or more objects.

SUMMARY

In view of the above, it is thus an object of the present teachings to provide an efficient and reliable support when tracking two or more objects. According to the present teachings, this may be provided by a system for tracking moving objects in a scene. The system comprises a first overview unit arranged to capture a first overview of a first portion of a scene, and a second overview unit arranged to capture a second overview of a second portion of a scene. The first portion and the second portion may be partly overlapping. The system furthermore comprises a PTZ-camera, able to pan, tilt and zoom, so as to image selected objects in the first or second portion of the scene. The first and the second overview unit are configured to detect and locate moving objects in the scene, and to transmit positional data of said moving objects to a control unit. The control unit is configured to use said positional data as input and determine if two or more moving objects may be imaged using a single view of the PTZ-camera, and to send instructions to the PTZ-camera to assume a first zoom setting and move to a first pan position and a first tilt position, so as to image said two or more moving objects.

In any embodiment a first object may be detected by the first overview unit and a second object may be detected by the second overview unit.

A system according to the present teachings will enable for an automatic and optimized support for tracking two or more objects in a larger scene.

In one or more embodiments the control unit utilizes a minimum zoom level or a user defined zoom level when determining if the two or more movable objects may be imaged in a single view. Minimum zoom level corresponds to the widest field of view possible to cover with the PTZ-camera. If objects are further apart it is not possible to cover them in a single PTZ-view. In some embodiments it may not be desirable to use the minimum zoom level, and then the user may define a zoom level that should constitute a lower limit. One reason could be that individuals should be large enough to be identified, number plates should be large enough to be read, etc.

In a typical embodiment said two or more moving objects are defined as a superobject, i.e., a number of the movable objects are included in the same superobject, and the superobject is treated as a single object, having a size, a movement, etc. Such superobject may not include all objects detected in the scene, as will be detailed in the detailed description.

A center point of such superobject may in one or more embodiments be defined as a geometrical center of the two or more moving objects. If the superobject is defined as the size of the smallest rectangle being able to circumvent all objects included in the superobject, the center point will be the center of the rectangle. This conveniently results in that if the pan position and tilt position of the PTZ-camera is set to direct it to the center point the zoom level will be optimal for that superobject, "optimal" implying that it will be zoomed in as much as possible while still including the whole superobject in its field of view.

In any embodiment the first overview unit and the second overview unit may continuously transmit positional data to the control unit, so that the control unit may continuously adjust pan, tilt and zoom settings of the PTZ-camera. Such an approach will enable the control unit to stay up to date with any development in the imaged scene. While typical image framerates could be 60 frames per second (fps) or 30 fps the control unit would not necessarily have to update the position of the PTZ-camera as often, such as e.g. 10 Hz or 5 Hz.

The control unit may form three or more objects in the scene as a number of superobjects, and it is preferred that one object only can form part of a single superobject, although there may be instances where objects may form part of more than one superobject. This will be briefly touched upon in the detailed description.

In one or several embodiments the control unit may be configured to arrange prioritization of the number of superobjects according to a set of criteria selected from the group comprising but not limited to; the size of each superobject should be equal or close to equal, each object should form part of one and only one superobject, each superobject should have at least one object in common with another superobject, the number of superobjects should be minimized, the distance between a present and a subsequent superobject should be minimized, superobjects with longer lifetime are considered more relevant, a superobject is only divided when the objects inside diverge too far, an object or a superobject positioned in an exclude zone should be disregarded or have a low priority, an object or a superobject positioned in an "prioritized zone" should have a higher priority, or a combination thereof.

Once a number of superobjects have been defined, the control unit may in some embodiments be configured to arrange a guard tour, meaning that it arranges for the PTZ-camera to shift between imaging the superobjects one after the other. In this way, an operator will be able to observe a chain of events on an overview, but the operator will also benefit from seeing close-up imaging of the objects of the scene. The set order may be set based on a priority value for the superobject. In this way the operator may either use an automatic setting or define own settings for prioritization, and the guard tour will mirror this prioritization.

In one or several embodiments each overview unit may be configured to estimate a size of detected movable objects, and the control unit may take the size into account when evaluating an object. This would be a crude way of discriminating between different object classes. Objects of a certain size could be classed as humans, while larger objects could be classed as cars and smaller as animals. This classification could be used when prioritizing objects and superobjects.

In more elaborate embodiments the overview unit, or associated processor, comprises algorithms for object classification, which may produce a more refined and reliable classification. In any embodiment objects not considered as relevant may be excluded from the formation of superobjects.

It is preferred that an overview unit corresponds to an overview camera, yet the present disclosure does not exclude that radar units or LIDAR units could be used instead. Radar and LIDAR devices are versatile positioning devices which may detect positions and velocities of objects in a scene with proven reliability, further the strength of the reflected signal, detected at these devices, may be used for object classification related to the size of the detected objects. These devices are not prone to false object detections due to lighting artefacts, like e.g. shadows, in the scene which is the case for many monitoring systems based on video analysis, which in turn result in advantages that makes them a viable alternative.

According to another aspect the present teachings relates to a method for tracking movable objects in a scene with a system according to one or more of the above disclosed embodiments. The system would thus comprise a first and a second overview unit and a PTZ camera, and the method comprises: detecting and locating an object with the first overview unit, transmitting first positional data of the moving object from the first overview unit to a control unit, detecting and locating an object with the second overview unit, transmitting second positional data of the moving object from the second overview unit to the control unit, in the control unit, combining the first positional data with the second positional data to form positional data for a superobject, comparing the positional data of the superobject with data of the PTZ-camera range, and if the superobject is determined to be within the range of the PTZ-camera, controlling the PTZ-camera to image the superobject.

The positional data of the superobject may comprise a size of the superobject and a pan position and a tilt position of the superobject.

The method may be adjusted to be able to include all variations of the inventive system according to one or any embodiment thereof.

BRIEF DESCRIPTION OF THE DRAWINGS

A more detailed understanding may be had from the following description, given by way of example in conjunction with the accompanying drawings where:

FIG. 4A-D is a sequence of views illustrating the evolution of superobjects; and FIG. 5 is a flowchart illustrating a method according to one embodiment.

DETAILED DESCRIPTION

Figure 1:
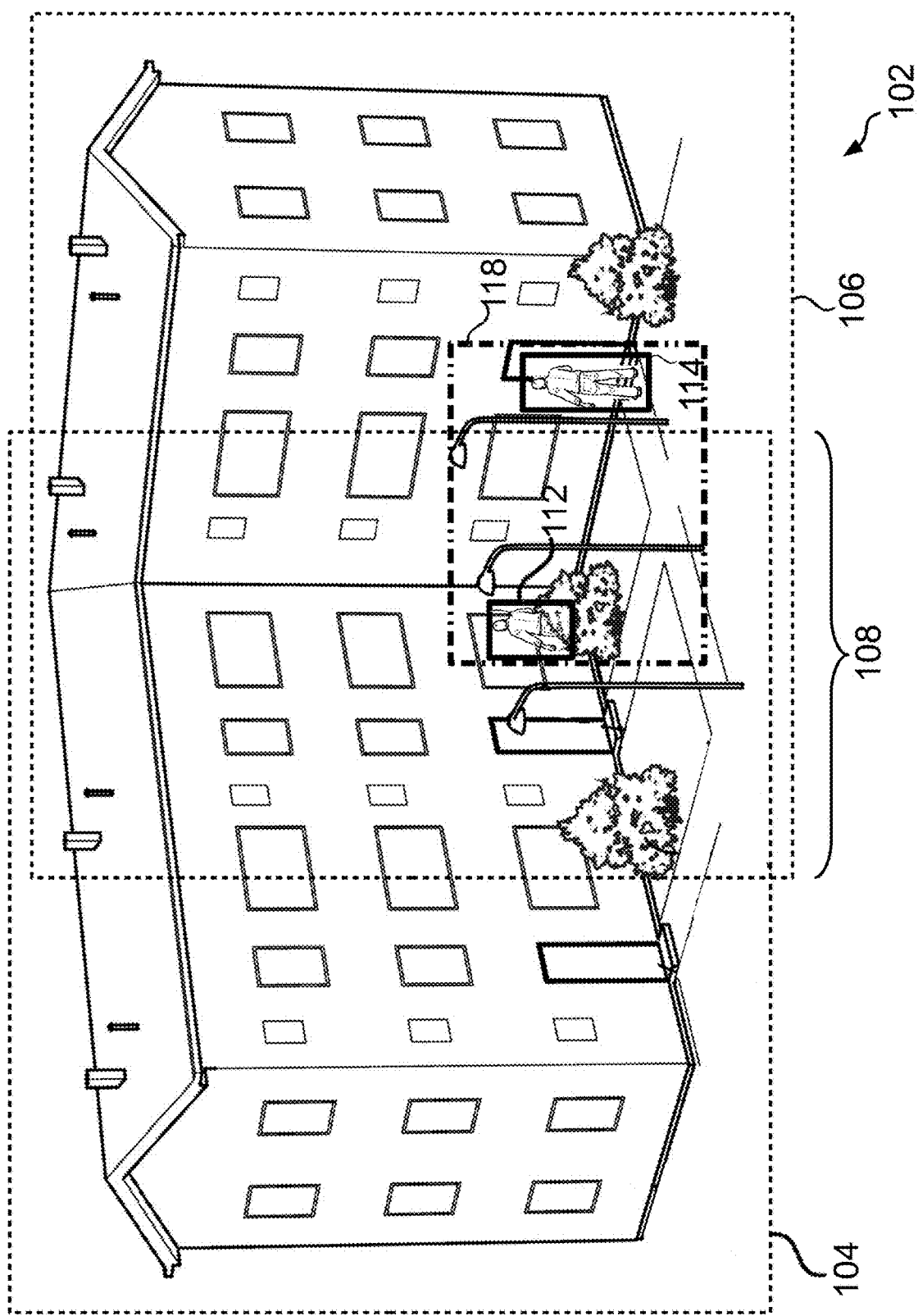
FIG. 1 illustrates schematically an overview comprising views from two overview cameras.
Figure 3:
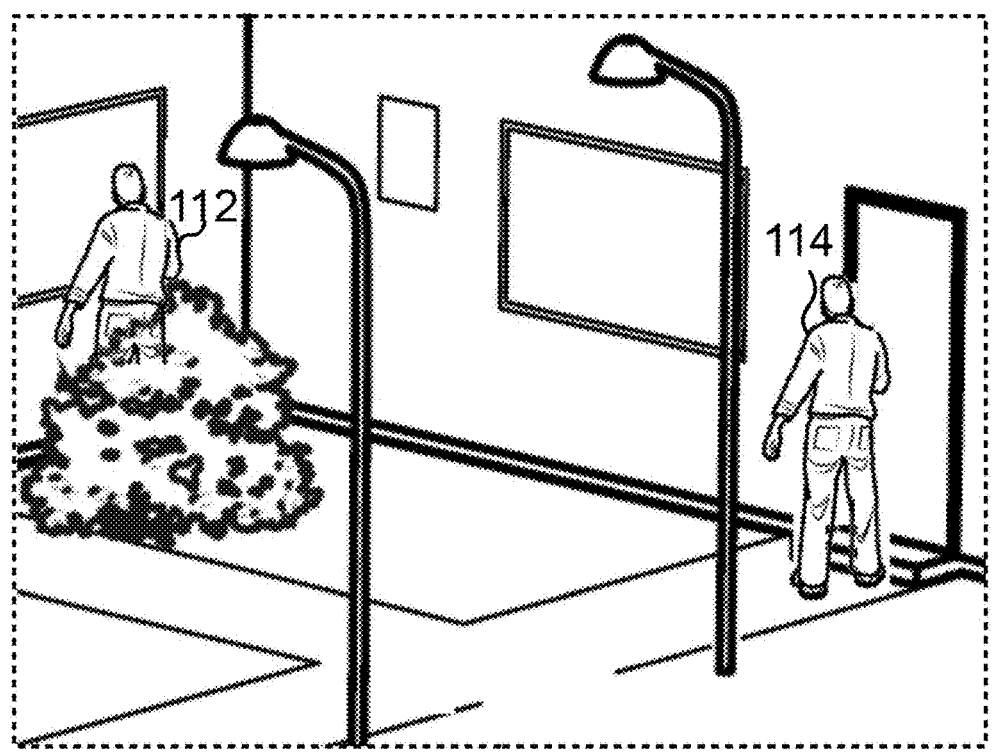
FIG. 3 is a close-up view of FIG. 1, as imaged by the PTZ-camera.

FIG. 1 illustrates an overview 102 of a scene. The overview 102 is a composite image comprising image data from two or more overview cameras 204, 206, shown in FIG. 2. The composite feature is illustrated by the two dotted rectangles 104, 106, each representing the view from one overview camera (204 and 206, respectively). The size of the overlap area 108 (an area imaged by more than one camera) may vary between a large overlap and none, or essentially none. In the overlap area image data from each camera may be blended, or one may use image data from a single camera only. The combination is often referred to as "blending" or "stitching", yet since it is not the focus of the present application it will not be mentioned any further. The two or more cameras 204, 206 are included in a system 200 also comprising a PTZ-camera 210, and each of the overview cameras 206, 204 have a field of view being wider than the minimum field of view accomplishable with the PTZ-camera 210. Furthermore, the PTZ-camera has an optical zoom ability enabling zooming in to achieve greater magnification than what is possible with the overview cameras 204, 206, and zooming out to dynamically adjust to changes in the scene.

The overview cameras may preferably be digital monitoring cameras having a fixed focal length and a fixed field of view of a scene.

Figure 2:
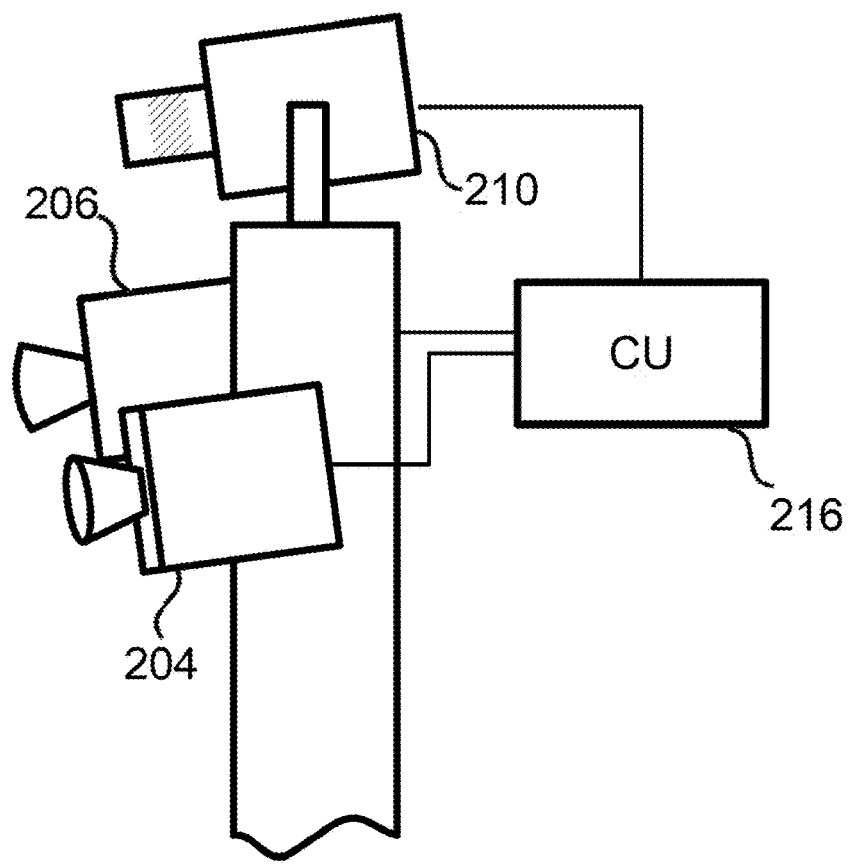
FIG. 2 illustrates a system comprising two overview cameras and one PTZ-camera.

The purpose of the combination of cameras included in the system of FIG. 2 is to enable for an operator to acquire an overview of an area to be surveilled (with the aid of the overview cameras 204, 206) while also enabling for the operator to acquire a detailed, close-up view of an object or area within the area to be surveilled (with the aid of the PTZ-camera 210).

Furthermore, the overview cameras may be used to digitally track objects in the scene, which may mean that an object-detection algorithm is used to find and track areas of motion in the imaged scene, or to detect objects by detecting distinguishable features. The areas may be marked with the commonly known rectangles, polygons or bounding boxes, indicating boundaries or geometrical center points of the object in motion. This is indicated by the two individuals defined by rectangles 112, 114 in FIG. 1. A digital zoom may be used to extract an electronically zoomed portion of the overview image, yet for higher-quality imaging the PTZ-camera 210 would be used as a preference. The PTZ-camera 210 includes a PT-motor enabling automated (or user controlled) pan motion and tilt motion, as well as a zoom motor enabling automatic (or user controlled) optical zoom.

The system further comprises a control unit 216 for enabling control of the system. A control unit may be embodied in several different ways, and the hardware may be arranged in several different locations, yet the functional feature for the purposes of the present teachings is to receive data from the overview cameras and to output data for control of the PTZ camera. In FIG. 2 the control unit is illustrated as a separate device, and it may be indeed arranged in such a way, yet it may also form part of a processing unit of one of the cameras (204, 206, 210), or be arranged remotely from the camera arrangement, such as integrated in a video management system. In most embodiments disclosed the PTZ-camera is arranged in close proximity of the overview cameras, even in the same arrangement. This enables for a position in the overview camera to be readily translated to a pan position and a tilt position in the coordinate system of the PTZ-camera using calibration data obtained for the arrangement. Arranging the PTZ-camera remotely results in a more complex situation since a more careful calibration would have to be performed. In other embodiments the overview cameras may be replaced by radar units, LIDAR units, or other units that could readily output an absolute position of an object, absolute in relation to a common coordinate system (such as a geographical coordinate). If so, the PTZ-camera may be positioned more freely, at a remote position from the overview units (overview cameras, radar units, LIDAR units, and the like). For that reason the term "overview unit" is hereby introduced, and although "overview camera" is used throughout most of the descriptions, it should be readily appreciated that other types of overview units may be used instead or even as a complement. When using an overview unit other than an overview camera, the size of an object may be more difficult to access. As an example, the radar response from a person will vary greatly depending on the position of the person in relation to the radar. Therefore, if size is of importance, other analytic functions may have to be added, such as object identification based on motion pattern (which may be scene dependent), velocity, and the like, which may be supported by visual confirmation (automatic or manual) using the PTZ-camera.

For the purposes of disclosure, the control unit may also be embodied in the form of a program on a computer or as an application (mobile app, application software, Web application, etc.).

Thus far the description essentially describes well-known art, and in the following features specific for the present teachings according to some embodiments thereof will be disclosed.

According to a first embodiment each of the overview cameras 204, 206, or at least a control unit thereof, comprises an object-detection algorithm enabling detection of objects 112, 114 in the imaged scene 102. The object-detection algorithm, or object in motion detection, see U.S. Pat. No. 8,121,424, may comprise an object-classification algorithm enabling determination of a class of a particular object (car, human, bike, dog, etc.). An output from the object detection algorithm may be data concerning the object, such as position, estimated size, pixel velocity, object class, etc., and the output may be forwarded to the control unit 216.

The control unit 216 may in turn translate the data (when applicable) to the coordinate system of the PTZ-camera, run the algorithms for generation of superobjects, and automatically guide the PTZ-camera 210 to the correct position, enabling a close-up view of one or more detected objects, and the size data to enable use of a suitable zoom setting. The control unit may also combine the data to generate more information, one example being that the current position of an object (e.g., when compensating for delay in data transfer, calculations and control of a PTZ camera) may be estimated by extrapolation, by using the latest positional data for the object, combined with the latest velocity data. In this way a PTZ-camera may be guided to a position in advance. Interpolations may also be used to generate more positional data.

According to this first embodiment as visualized in FIG. 5 the control unit 216 is configured to receive at least positional data concerning a first and a second object, 112 and 114, respectively. Based on the positional data, as translated into the coordinate system of the PTZ-camera, the control unit is configured to derive a superobject 118 including both objects 112, 114, i.e., both a position and a size for the resulting superobject 118. The superobject 118 may be combination of the two (or more) sets of object data concerning at least position and size, and the parameters of the superobject is based on the estimated size of the combination of the two objects, as defined by a geometrical shape extending over both objects, and any intermediate space. The geometrical shape may be a rectangle or other polygon of a size that may cover the two or more objects. The center point may be defined as geometrical center of the superobject. Since the ultimate goal is to find a suitable setting for a PTZ-camera the geometrical shape may mimic a rectangle having an aspect ratio of the PTZ-camera imaging system.

In a following step the control unit is configured to access data concerning the PTZ-camera, and use the data in combination with the super-object and center point to determine if the PTZ-camera may be arranged in a pan position and tilt position, and with a zoom setting, such as to image the superobject.

If so, in a third step, the PTZ-camera will be controlled to assume such a position by control of the pan/tilt motor and the zoom motor.

In this way the PTZ-camera may be used to track multiple objects, and the introduction of several objects in the scene may not have to result in that the PTZ-camera would have to choose between the objects unless absolutely necessary.

The following tracking may be based on data acquired by the PTZ-camera, yet it may also—or instead—be based on data acquired from overview cameras.

While the above situation not very complex, the control unit may also be configured to handle a number of upcoming situations. The following embodiments may be combined in any and every way.

Starting from the first embodiment, the objects may come closer together, in which case the control unit may generate new data concerning the size of the super-object, resulting in a shift of the zoom settings of the PTZ-camera. The objects may also move apart, in which case the zoom settings may change in the corresponding manner.

The control unit is configured to have automatic or user-defined thresholds concerning the zoom settings. One threshold may be the minimum zoom setting, i.e., when the zoom camera has its widest field of view. This is of course a distinct limitation for imaging using the zoom camera. Instead of using this ultimate limitation a user may of course add further thresholds, e.g. a threshold concerning that the PTZ-camera should not zoom out beyond a particular zoom setting. Another type of threshold could be determined by that a human face, or another object, should occupy a set number of pixels (or more), or a minimum resolution. The latter may be interesting for forensic purposes, where a minimum resolution of a face may be required to ensure identification.

Regardless of the reason for the zoom threshold, the scene may change such that it is not possible to define a superobject that can be imaged using the PTZ-camera. In such a case the control unit is configured to adapt to the situation, which may be accomplished in one of several ways depending on the situation.

In one situation, the objects are separated beyond the reach of the PTZ zoom capability, e.g. a threshold for the zoom setting is reached (which may be ultimate or user defined). One reason could be that existing objects diverge from each other, and another reason could be that one or more additional object enters the field of view, both resulting in that a calculated size of the resulting superobject is too large to image in one view with allowed settings of the PTZ-camera. In such a situation the control unit may be configured to exclude one or more of the objects from the superobject.

Exclusion of an object may be based on a prioritization. The priority may be set by a user, yet it may also be based on the identified object class, a specific identity of the object (in the case of an individual), etc., or in another automatic or semi-automatic manner.

The analytics of the control unit may for this purpose calculate size and position for all superobjects emanating from all combinations of objects in a scene. As an example, in a scene where three objects are detected there will be a total of three individual objects resulting in four superobjects (one superobject comprising all three objects and three combinations of superobjects consisting of two objects). If an additional object is introduced there will be a total of eleven possible superobjects and for a scene with N objects the number of possible superobjects $N_{SO}$ would equal:

$$N_{SO} = \Sigma_{n=2}^{N} C(N,n)$$

This calculation is theoretical, and any single object will form part of several superobjects, which may not be very practical. In a real life situation there would be constraints on the size of the superobject, which would eliminate a number of superobjects, and some further constraining parameters are disclosed below.

If the control unit is unable to find a single suitable PTZ-setting one or more objects may be excluded (as mentioned above). The control unit may also automatically generate a guard tour, meaning that the PTZ-camera may be controlled to image superobjects one at the time in a continuous process, i.e., to move around in the scene, image one superobject for a defined period of time and thereafter move on to the next superobject. In this way it is ensured that all objects are imaged and tracked (unless explicitly excluded). Returning to the embodiment where four objects are in the scene there are numerous alternatives to define a superobject, and to generate a guard tour based on all combinations would generate a significant amount of redundant information. The control unit may then instead generate (or select) superobjects based on a number of possible criteria: (i) the size of each superobject should be equal or close to equal (to prevent large shifts in zoom level), (ii) each object should form part of one and only one superobject (to avoid redundancy), (iii) each superobject should have at least one object in common with another superobject (to provide continuity in the guard tour), (iv) the number of superobjects should be minimized, (v) the distance (in PTZ-space) between a present and a subsequent superobject should be minimized (to maximize efficiency and improve continuity during a guard tour), (vi) superobjects with longer lifetime are considered more relevant, (vii) a superobject is only divided when the objects inside diverge too far, (viii) an object or a superobject positioned in an "zone of less importance" or "exclude zone" (a zone in the scene defined by a user to be of less or no importance) should be disregarded or have a low priority (and an object or a superobject positioned in an "include zone" (a zone in the scene defined by a user to be of importance) should have a higher priority).

One or several criteria may be used in a hierarchical manner in all possible ways. The prioritization may be a continuous process enabling adaptation to situation where the grouping of objects shift, or the number of objects in the scene shifts up or down.

The above description illustrates the versatility of superobject generation, and how it may be varied in an endless number of ways. Limitations may be computational power, expected rate of output, etc. In yet another embodiment it is established that two objects may be combined to a superobject given that they are close enough. Neither object in isolation may form part of another superobject unless it is preceded by the two objects move so far apart that they are no longer defined as a superobject. In this way, the amount of calculations necessary are kept at a minimum, and an inertia is introduced into the method. Superobjects will not shift between video frames, which is to the benefit of an operator, e.g. in the embodiments where a guard-tour has been set up automatically. In the following, FIGS. 4A-C will be used to explain a situation where this simplified approach is applied to a practical case.

In the drawings objects are indicated by rectangles drawn in full lines, superobjects by rectangles drawn in dash-dotted lines, and any direction of movement by arrows. Starting with FIG. 4A there are three objects detected in the scene to begin with. A first object 420 and a second object 422 has already been defined as a first superobject 424. There is also a third object 426, which is too far away from the first superobject 424 to be associated with the same, and thus it may be defined as a second superobject 428. In this case the superobject and the object may coincide, and the definition of a superobject may be skipped altogether. In the subsequent view of FIG. 4B the three objects have moved slightly. The first object 420 has started to distance itself from the second object 422, and a fourth object 430 has entered the scene. The fourth object 430 is too far away from the third object 426 to join the same superobject 428, so it forms a superobject 432 on its own. In the next sequential view, of FIG. 4C the third and fourth object are close enough to be joined into a single superobject 428, which is done. The second object 422 is actually close enough to join the same superobject 428, yet since it is already part of a previous superobject 424 extending beyond the range of the superobject 428 it will not. Finally, in the fourth view the first object 420 and the second object 422 have departed so far that they can no longer be defined by the same superobject 424, and there is a breakup. The second object 422 then joins the superobject 428.

It is readily understood that the approach described above is far less complex than some of the other possible approaches, in that it follows less than a handful of prioritized rules.

Returning to the generalization of overview unit, an embodiment (not shown) dedicated for use of radar could be that several radar units with overlapping detection ranges cover a large area, while a PTZ-camera is arranged so as to be able to zoom on most portions of the large area. One could imagine an area in which there are manmade or natural constructions covering a line of sight, rendering use of a single radar insufficient, or an area being larger than what is possible to cover by a single radar also making a single radar inadequate for full coverage. Furthermore, one could imagine the PTZ-camera being arranged on a pole or at another elevated position, so that it can look beyond the constructions obstructing the radar. Since the radar will give distance information for each detected object information from the radar may be used to preset the focus of the PTZ-camera, and if the distance between objects of a superobject in a line-of-sight direction of the PTZ-camera the depth of field may also be preset.

FIG. 5 is a flow chart disclosing a general outline of an inventive method according to one embodiment thereof. According to the method for tracking moving objects in the scene one or more objects are detected (510) using a first and second overview unit. Data concerning the detected one or more objects is transmitted (520) to a control unit, which assesses (530) the possibility of generating a close-up of two or more of the objects simultaneously using a PTZ-camera. If so, the control unit controls (540) the camera to assume the correct pan/tilt/zoom position for such close-up.

What is claimed is:

1. A system for tracking two or more movable objects in a scene, the system comprising:
   a first overview unit arranged to capture a first overview of a first portion of a scene;
   a second overview unit arranged to capture a second overview of a second portion of a scene, wherein the first portion and the second portion may be partly overlapping, wherein one or both of the overview units is a camera, a radar unit, or a LIDAR unit; and
   a PTZ-camera, able to pan, tilt and zoom, so as to image selected objects in the first or second portion of the scene;
   wherein the first and the second overview units are configured to detect and locate the two or more movable objects in the scene, and to transmit positional data of the two or more movable objects to a control unit;
   wherein the control unit is configured to:
      use the positional data of the two or more movable objects as input to determine if the two or more movable objects may be imaged using a single view of the PTZ-camera, wherein the control unit utilizes a threshold zoom setting of the PTZ-camera when determining if the two or more movable objects may be imaged in a single view of the PTZ-camera; and
      send instructions to the PTZ-camera to assume a first zoom setting and move to a first pan position and a first tilt position, so as to image the two or more movable objects concurrently.

2. The system of claim 1, wherein the two or more movable objects are defined as a superobject, having a center point.

3. The system of claim 2, wherein a center point of the superobject is defined using the size and position of the objects included in the superobject, and wherein the control unit is configured to direct the PTZ camera to the center point.

4. The system of claim 1, wherein the first overview unit and the second overview unit continuously transmits positional data of detected objects to the control unit, so that the control unit may continuously adjust pan, tilt and zoom settings of the PTZ-camera.

5. The system of claim 1, wherein the control unit is arranged to define three or more objects in the scene as a number of superobjects, wherein each superobject comprises at least two objects, and wherein one object may form part of more than one superobject or, wherein an object may only form part of a single superobject.

6. The system of claim 5, wherein the control unit is configured to arrange prioritization of the number of superobjects according to a set of criteria selected from the group comprising but not limited to any one or a combination of: the size of each superobject should be equal or close to equal; each object should form part of one and only one superobject; each superobject should have at least one object in common with another superobject; the number of superobjects should be minimized; the distance between a present and a subsequent superobject should be minimized; superobjects with longer lifetime are considered more relevant; a superobject is only divided when the objects inside diverge too far; an object or a superobject positioned in an exclude zone should be disregarded or have a low priority; and an object or a superobject positioned in an "include zone" should have a higher priority.

7. The system of claim 5, wherein the control unit is configured to arrange a guard tour, such that it moves the PTZ-camera between the existing superobjects in a set order.

8. The system of claim 7, wherein the set order is set based on a priority value for the superobject.

9. The system of claim 1, wherein each overview unit is configured to estimate a size of detected movable objects.

10. The system of claim 1, wherein each overview unit is arranged to determine an object class for detected movable objects.

11. A method for tracking two or more movable objects in a scene with a system comprising a first overview unit, a second overview unit, one or both of the overview units being an overview camera, a radar unit, or a LIDAR unit, and a PTZ camera, the method comprising:
   detecting and locating a first movable object with the first overview unit;
   transmitting first positional data of the first movable object from the first overview unit to a control unit;
   detecting and locating a second movable object with the second overview unit;
   transmitting second positional data of the second movable object from the second camera to the control unit;
   in the control unit, combining the first positional data with the second positional data to form positional data for a superobject;
   comparing the positional data of the superobject with data of a range of the PTZ-camera taking into account a threshold zoom setting of the PTZ-camera; and
   in response to the superobject being determined to be within the range of the PTZ-camera, controlling the PTZ-camera to image the superobject.

12. The method of claim 11, wherein positional data of the superobject comprises a size of the superobject and a pan position and a tilt position of the superobject.

13. A control unit configured to:
   derive positional data concerning a first object and a second object;
   derive positional data of a superobject including the first and second objects;

compare the positional data of the superobject with data of a range of a PTZ-camera taking into account a threshold zoom setting of the PTZ-camera;

in response to the superobject being determined to be within the range of the PTZ-camera, control the PTZ-camera to image the superobject, wherein the positional data concerning the first object and the second object comprises a size of the respective object, and wherein the positional data of the superobject comprises a size of the superobject, wherein the size of the superobject is defined by a geometrical shape extending over the size of first object, the second object and any intermediate space.

14. The control unit according to claim 13, wherein the geometrical shape is a rectangle having an aspect ratio mimicking an aspect ratio of the PTZ-camera.

15. The control unit according to claim 13, wherein threshold zoom setting of the PTZ-camera is set such that the first object and/or the second object is/are depicted by a minimum number of pixels in an image captured by the PTZ-camera.

16. The control unit according to claim 13, wherein threshold zoom setting of the PTZ-camera is set such that the first object and/or the second object is/are having a minimum resolution in an image captured by the PTZ-camera.

17. A method for tracking two or more objects in a scene, the method comprising:

deriving positional data of a first object;

deriving positional data of a second object;

combining the positional data of the first object with the positional data of the second object to form positional data for a superobject;

comparing the positional data of the superobject with data of a range of a PTZ-camera taking into account a threshold zoom setting of the PTZ-camera; and in response to the superobject being determined to be within the range of the PTZ-camera, controlling the PTZ-camera to image the superobject, wherein the positional data concerning the first object and the second object comprises a size of the respective object, and wherein the positional data of the superobject comprises a size of the superobject, wherein the size of the superobject is defined by a geometrical shape extending over the size of first object, the second object and any intermediate space.

* * * * *